UNITED STATES PATENT OFFICE.

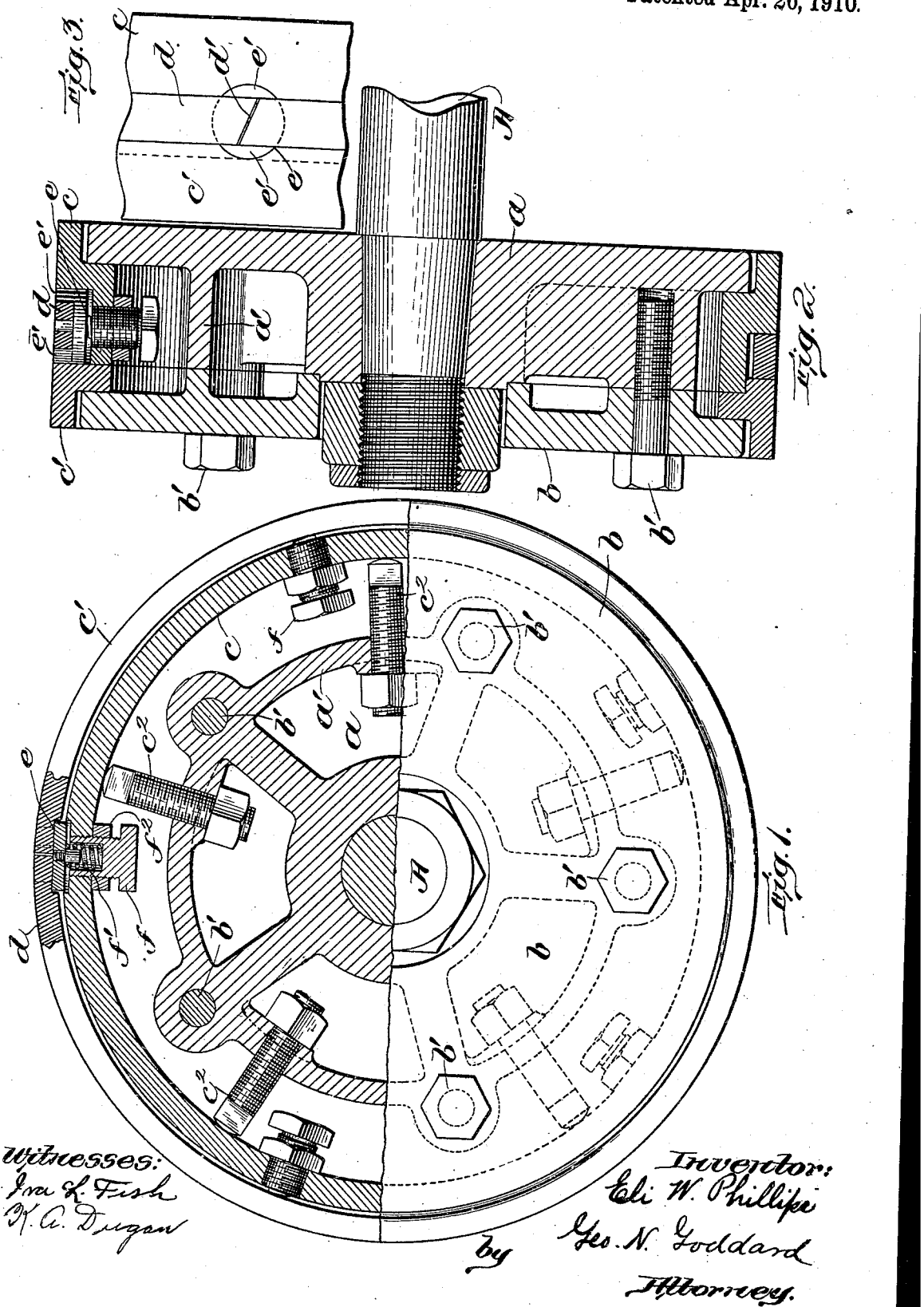

ELI W. PHILLIPS, OF BOSTON, MASSACHUSETTS, ASSIGNOR TO AMERICAN TOOL AND MACHINE COMPANY, OF BOSTON, MASSACHUSETTS, A CORPORATION OF MASSACHUSETTS.

CYLINDER-PISTON.

956,163. Specification of Letters Patent. Patented Apr. 26, 1910.

Application filed May 18, 1906. Serial No. 317,625.

*To all whom it may concern:*

Be it known that I, ELI W. PHILLIPS, citizen of the United States, and resident of Boston, county of Suffolk, Massachusetts, have invented certain new and useful Improvements in Cylinder-Pistons, of which the following is a specification.

This invention relates to pistons for steam engines and other cylinders and is intended to provide a simple and efficient construction by which the packing ring may be readily adjusted to form a close contact with the wall of the cylinder and further improve the construction of the piston to permit the removal of the packing ring at any time without interfering with the adjusting means.

In the accompanying drawings I have illustrated one of the preferred modes of practicing my invention.

Figure 1 is an end elevation partly in central section of a piston constructed according to my invention. Fig. 2 is a transverse central section of the same at right angles to the plane of Fig. 1. Fig. 3 is a detail plan view showing the construction for breaking the joint of the split ring.

In the practice of my invention according to the specific form illustrated in the drawings, I provide a central head $a$ which forms the framework for the piston and which is secured to the piston rod A in any suitable manner. The follower plate $b$ is bolted to the head $a$ by means of suitable bolts $b'$ as illustrated. Between the follower and the head is an annular space in which rests the peripheral two-part ring $c$ $c'$ commonly called the bull-ring. One side of the main section $c$ of the peripheral ring is chamfered off to form an annular groove or channel to receive the packing ring $d$ which is here shown as in the form of a split ring having a diagonal intersecting cut as shown at $d'$ to permit the expansion of the ring in order to completely fill the cylinder and lie in close contact with the wall thereof. The peripheral ring is accurately adjusted or centered by means of the radial centering screws $c^2$ which are tapped through an annular web or flange $a'$ formed in the head $a$ so that their ends abut against the inner face of the peripheral ring $c$ at various points around the circle. Obviously by the adjustment of these centering screws the peripheral ring may be accurately centered with reference to the head $a$. Inasmuch as the section $c'$ of the peripheral ring overlaps the depressed or recessed portion of the section $c$ of said ring, its position with reference to the center is determined by the position of the section $c$. This adjustable peripheral ring is provided at suitable points around its circumference with adjustable hollow nuts or set screws $f$ formed with outwardly opening recesses in which are seated spiral springs $f'$ adapted to normally press outward against the inner face of the packing ring $d$. At the point where the intersection $d'$ of the split packing ring $d$ is situated there is placed a small plug or disk $e$ seated in a recess formed at the outer face of the ring $c$ and the corresponding part of the inner face of the packing $d$. This disk $e$ is cut away to leave two shoulders or cheeks $e'$ projecting outward on either side of the packing ring as shown in Figs. 2 and 3, the outer face of these cheek pieces lying flush with the outer face of the packing ring $d$ so as to completely break the joint formed in the split ring. Obviously by the outward adjustment of the radially arranged hollow set screws $f$ the tension on the springs $f'$ will be increased so as to expand the packing ring $d$ with a yielding pressure against the sides of the cylinder. It is apparent that any desired degree of tension may be secured by turning up these tension screws. The screws themselves may be locked in place by means of suitable jam nuts $f^2$ as the external thread is continued along its shank for that purpose.

In case it is desired to remove the packing ring it is only necessary to take off the follower $b$ after removing its retaining screw $b'$ and when this is done there is nothing to prevent the endwise withdrawal of the section $c'$ of the peripheral ring and the packing ring itself and in so doing all disturbance of the adjustments of the piston may be avoided. On the other hand the abutting sections $c$ $c'$ of the peripheral ring are securely held together by means of the follower without interfering with the freedom of movement of the packing ring which they inclose or contain.

It will be seen that the piston head and follower in the construction shown serve to clamp the overlapping sections of the peripheral ring firmly together so as to permit a firm and rigid central supporting structure for the reception of the expansible packing ring.

Without attempting to indicate the various changes in form, construction and arrangement that may be made in the practice of my invention, what I claim is:—

1. A piston embracing in its construction, a sectional head, a peripheral ring adjustably secured thereto provided with an annular groove, an expansible packing ring seated in said groove, and adjusting means for exerting a variable tension to expand said packing ring, substantially as described.

2. A piston embracing in its construction, a piston head, a two-part peripheral ring carried by said head, centering devices for centering said ring in relation to said head, said ring being provided with a peripheral channel or groove, an expansible packing ring seated in said channel, and adjustable tension devices arranged to expand said ring outwardly, substantially as described.

3. A piston embracing in its construction, the central supporting structure provided with a series of radial hollow adjusting screws, outwardly acting tension springs seated in the hollow portion of said screws, and a split packing ring surrounding said central supporting structure and resting upon said tension springs, substantially as described.

4. A piston embracing in its construction, a piston head, a follower plate, a two-part peripheral ring whose adjoining edges overlap each other, said peripheral ring being clamped between the follower and the piston head and being provided with a peripheral groove, and an expansible packing ring seated in said groove, substantially as described.

In witness whereof, I have hereunto set my hand, this tenth day of May 1906.

ELI W. PHILLIPS.

In the presence of—
  GEO. N. GODDARD,
  KATHARINE A. DUGAN.